US006921053B1

(12) United States Patent
Heck

(10) Patent No.: US 6,921,053 B1
(45) Date of Patent: Jul. 26, 2005

(54) PIVOTAL CABLE SUPPORT

(76) Inventor: Gordon Heck, 350 Hearst Dr., Oxnard, CA (US) 93030

( * ) Notice: Subject to any disclaimer, the term of this patent is extended or adjusted under 35 U.S.C. 154(b) by 84 days.

(21) Appl. No.: 10/679,811

(22) Filed: Oct. 7, 2003

(51) Int. Cl.[7] ................................................ F16L 3/08
(52) U.S. Cl. ............................ 248/65; 248/51; 248/50; 248/534; 248/229.14; 248/227.3; 43/21.2
(58) Field of Search ...................... 248/229.14, 229.24, 248/227.3, 227.4, 230.5, 231.61, 65, 514, 248/519, 521, 518, 51, 50, 79, 540, 531, 248/534; 43/21.2

(56) References Cited

U.S. PATENT DOCUMENTS

| | | | | |
|---|---|---|---|---|
| 688,094 | A * | 12/1901 | Jones | 248/231.61 |
| 1,162,607 | A * | 11/1915 | Baldwin | 414/565 |
| 2,602,618 | A * | 7/1952 | Cohen | 43/21.2 |
| 2,704,412 | A * | 3/1955 | Davis | 43/21.2 |
| 2,835,066 | A * | 5/1958 | Spilker | 43/21.2 |
| 2,905,413 | A * | 9/1959 | Harris | 43/21.2 |
| 4,198,775 | A * | 4/1980 | Leisner | 43/21.2 |
| 4,551,939 | A * | 11/1985 | Kitchens | 43/21.2 |
| 4,831,763 | A * | 5/1989 | Alcorn | 43/21.2 |
| 5,142,809 | A * | 9/1992 | O'Brien et al. | 43/21.2 |
| 5,231,785 | A * | 8/1993 | Roberts | 43/21.2 |
| 5,295,321 | A * | 3/1994 | Matura | 43/21.2 |
| 5,325,620 | A * | 7/1994 | Reed et al. | 43/21.2 |
| 5,365,689 | A * | 11/1994 | Holliman | 43/21.2 |
| 5,437,122 | A * | 8/1995 | Wilson | 43/21.2 |
| 5,560,137 | A * | 10/1996 | Herring | 43/21.2 |
| 5,987,804 | A * | 11/1999 | Shearer et al. | 43/21.2 |
| 6,357,166 | B1 * | 3/2002 | Malmanger et al. | 43/21.2 |
| 6,584,723 | B2 * | 7/2003 | Elmore | 43/4.5 |

* cited by examiner

Primary Examiner—Kimberly Wood
(74) Attorney, Agent, or Firm—Roger A. Marrs

(57) ABSTRACT

A two-component pivotal cable support includes a stationary clamp and a movable cradle mounted on the clamp for supporting a cable wherein the clamp is detachably connected to a stanchion of a boat. The movable cradle, which is pivotally mounted on the clamp, is formed with a curved, open channel portion that is arcuate in side elevation. This channel portion serves as a holder for supporting equipment, or, in the present example, a cable. The cradle includes an open frame with opposite sides joined by a cross member wherein the center of the cradle is exposed and the channel portion of the cradle is supported by perpendicular support posts. These perpendicular support posts can withstand excessive amounts of cable weight. The support posts join the cradle with the cross member midway between the frame opposite ends. A cylindrical spindle is perpendicular to the cradle and downwardly depends from the cradle. The stationary clamp includes a cylindrical receptacle for pivotally receiving the spindle, yoke and closure members for releasably joining with a stanchion, post or the like. Both the yoke and closure members have semi-circular recesses. The turning axis of the spindle is parallel with the central longitudinal axis of the stanchion. Counter-sunk recesses are in the closure member to accept screws as securement fasteners so that the fasteners do not extend beyond the body of said members.

2 Claims, 1 Drawing Sheet

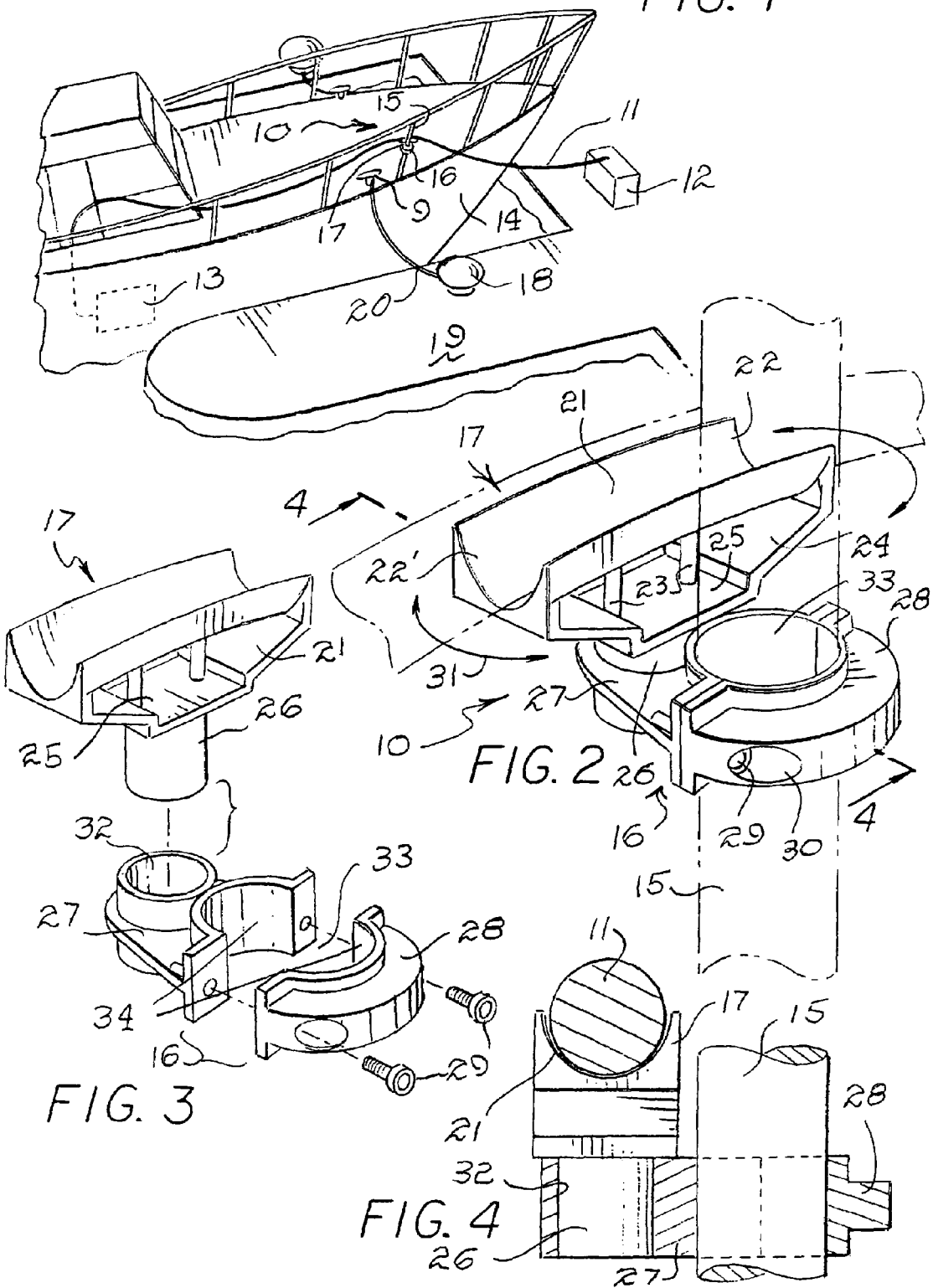

PIVOTAL CABLE SUPPORT

BACKGROUND OF THE INVENTION

1. Field of the Invention

The present invention relates to the field of cable supports, and more particularly to a cable support which relieves tension, chafing and fatigue on the cable by using a pivotal cable cradle and stationary support combination.

2. Description of the Prior Art

In the past, it has been conventional procedure to extend a power cable from a dockside power box to a battery charger on a boat when the battery requires charging. This procedure frequently causes cable chafing and stretching to occur which may subsequently cause electrical shorts and fires. Such cable chafing normally occurs as the cable rubs against the rail or coping of the boat and any stanchions or other boat equipment present. Therefore, a long-standing need has existed to provide a cable support that eliminates the stretching and chafing damage caused by cables that are in constant or intermittent movement and by friction due to the rocking motion of the boat as water waves or tidal changes occur, such as those experienced on a lake, in a marina or in a bay.

SUMMARY OF THE INVENTION

Accordingly, the above problems and difficulties are avoided by the present invention which provides a two-component pivotal cable support that includes a stationary clamp which is detachably connected to a stanchion of a boat and a movable cradle for supporting a cable. The movable cradle, which is pivotally mounted on the clamp, is formed with a curved, open channel that is arcuate in side elevation. This channel is useful as a holder for supporting equipment, gear, parts, an ashtray, or, in the present example, a cable. The cradle includes an open frame with opposite sides joined by a cross member so that the center of the cradle is exposed and it can be seen that the channel of the cradle is supported by perpendicular support posts. These perpendicular support posts can withstand substantial cable weight. The support posts join the cradle with the cross member midway between the frame opposite ends. A cylindrical spindle is perpendicular to the cradle and downwardly depends from the cradle. The stationary clamp is comprised of both a yoke member having a cylindrical receptacle for pivotally receiving the spindle, and a closure member detachably connectable with the yoke member for releasably joining with a stanchion, post or the like. Both the yoke and closure members have matable semi-circular recesses.

The turning axis of the spindle is parallel with the central longitudinal axis of the stanchion. Counter-sunk recesses are in the closure member to accept screws as securement fasteners which are screwed through the yoke member and the closure member so that the fasteners do not extend beyond the body of said members.

One primary object of the present invention is the provision of a cradle assembly composed of a curved channel that prevents chafing and damage due to abnormal stretching and wear of a cable placed within the cradle and which has an open, arcuate curved channel allowing for easy placement of a cable on the cradle, but still allows for the cable to be contained within the cradle during rotational or pivotal movement of a boat due to rocking waves.

Another object resides in providing a cable or other article holder able to be detachably connectable to a boat stanchion or the like and that includes a movable cradle for releasably supporting the cable or other article.

Yet a further object of the invention resides in a two-component holder with a first component detachably secured to a boat stanchion and a second component having an open channel on a cradle pivotally mounted on the first component.

Another object of the present invention is to provide a cable support to accommodate for a pivoting motion of a cradle, whereby a securement member having a cylindrical receptacle insertably receives a spindle or axle of a cradle to provide free rotation so that when tension or pressure is applied to a cable located in the cradle, the cradle moves accordingly with a pivoting motion whereby the cable is unconstrained and free to move as necessary as to avoid damage.

Still another object resides in providing a cable damage prevention support which permits a supported cable to move in order to accommodate environmental conditions or forces which may cause wear, fatigue or damage to the cable.

A further object is to movably support an electrical cable on a stationary member of a boat so as to avoid damage due to chaffing, wear or stretching by movably supporting the cable thereon.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is an environmental perspective view of the invention and illustrates a boat in a boat slip and tethered from an on-board cleat to a boat dock cleat and a power box with a cable running through the invention and connecting to an on-board battery charger;

FIG. 2 is an enlarged perspective view of the cable support as shown in FIG. 1;

FIG. 3 is an exploded view of the invention as shown in FIG. 2 showing the cradle and clamp members preparatory to assembly on a stanchion or post; and FIG. 4 is a transverse, cross-sectional view taken in the direction of arrows 4—4 of FIG. 2.

DESCRIPTION OF PREFERRED EMBODIMENT

Referring now to FIG. 1, an electrical cable support is indicated in the general direction of arrow 10 with a cable 11 extending from a power box 12 to a battery charger 13 located on a boat 14. The cable support 10 includes two components or members and is attached to a boat stanchion 15 via a clamping member 16 with the cable 11 running through a cradle member 17.

FIG. 1 further illustrates that the boat 14 is tethered to a dock cleat 18 located on a dock 19 by a mooring line 20 that connects to the on-board cleat 9 located on the boat 14. The cable support 10 may be used for supporting the mooring line 20, if desired.

Referring now to FIG. 2, it can be seen that the cable support 10 is comprised of a cradle member 17 rotatably supported on a clamp member 16. The cradle member is further comprised of an arcuate semi-circular channel 21 with open ends 22 and 22' and perpendicular spaced-apart support posts 23 joined with a cross member 24 midway between its opposite ends, thereby forming the frame 25. A cylindrical spindle 26 is perpendicular to the cradle member 17 and downwardly depends therefrom.

The stationary clamp member 16 is comprised of both a yoke member 27 and a closure member 28 which includes mated semi-circular openings encompassing the stanchion 15. Both the yoke member 27 and the closure member 28 accept screws 29 as securement fasteners which are disposed through counter-sunk holes 30 and burrowed into the body of the yoke and closure members. Therefore, the fastener heads do not project beyond the exterior surface of the closure member. The reciprocal pivoting motion of the cradle member 17 is demonstrated with an arrow 31.

Referring now to FIG. 3, it can be seen that the spindle 26 downwardly depends from the cradle frame 25 and is insertedly received by a receptacle 32 provided in the yoke member 27. Furthermore, it can be seen that the closure member 28 contains counter-sunk holes 30 which receive screws 29 to act as fasteners to retain the semi-circular openings or recesses 34 mated together to provide a circle 33 defined by the yoke 27 and clamping members 28.

Referring now to FIG. 4, it can be seen that the cable 11 rests in the channel 21 of cradle member 17 with downwardly depending spindle 26 in receptacle 32 encompassed by the yoke and closure members 27 and 28. Clamping of the members 27 and 28 is secured to the stanchion 15 by closure member 28.

In view of the foregoing, it can be seen that the electrical cable, mooring line support incorporating the present invention is used to prevent chafing and stretching of electrical cords, cables or mooring lines which run between a boat and a boat dock, thereby preventing potential electrical shorts and fires caused by damage to the cords or chaffing and fatigue of mooring lines. Such a cable or line support is primarily used in the field of sailing, motor boating and other nautical activities which must endure constant change in distance between a boat stanchion and the dock due to rocking waves or tidal changes. By employing such a cable support system, electrical cables or mooring lines are spared unnecessary fatigue and safety hazards are avoided. In addition, the cable support channel foreseeably is used as a holder for equipment, gear, parts, or as an ashtray.

Vertical motion of the boat is accommodated by the sliding of the cable through the open ends of the cradle. The arcuate shape of the cradle maintains the cable high in the middle of the cradle while the cable is lower at each end of the cradle. Yawing movement of the boat is accommodated by the pivotal action of the cradle with respect to the stationary clamp.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A two-component cable support comprising:
    a support means constituting a first component;
    a cradle member constituting a second component and movably mounted on said support means;
    said cradle member integrally provided with an open-ended channel carried on a frame;
    movable means integrally formed with said cradle member and disposed between said frame and said support means for allowing rotational movement between said cradle member and said support means;
    said movable means includes a spindle downwardly depending from said frame;
    said support means having a laterally disposed receptacle for insertably receiving said spindle for pivoting rotation of said cradle means about a vertical axis with respect to said support means;
    said support means includes a clamp laterally disposed with respect to said receptacle for maintaining said support means in a stationary and fixed relationship with respect to said cradle member;
    said clamp having an opening with a vertical axis parallel to and in spaced-relationship to said vertical axis of said receptacle;
    said cradle member channel is arcuate in side elevational view and is semi-circular in transverse cross section;
    said cradle member further having opposite ends separated by said channel;
    said frame includes a base extending between said opposite ends and located beneath said channel;
    a pair of spaced-apart posts supporting said channel on said base; and
    said channel being elongated and adapted to receive and movably support a cord or line for accommodating said rotational movement of said cradle member.

2. A device for supporting a line or cord to prevent chaffing, wear and fatigue comprising;
    a two-component device wherein a first component is a cradle and a second component is a stationary support for pivotally mounting said cradle;
    said cradle having an arcuate channel with open opposite ends;
    a frame disposed on said cradle midway between said opposite ends;
    a pivot spindle downwardly depending from said frame;
    said stationary support having a receptacle insertably receiving said spindle whereby said cradle rotates with respect to said stationary support about a vertical longitudinal axis;
    said stationary member includes a releasable clamp for securing said stationary member to a fixed stanchion;
    said clamp comprises a yoke member and a closure member detachably connected to said yoke member;
    said yoke member and said closure member include matable semi-circular cavities for engaging said stanchion;
    said channel is elongated and adapted to receive and support a cord or line accommodating rotational movement thereof to avoid cord or line chaffing, wear and fatigue on said cord or line;
    said cradle member channel is arcuate in side elevational view and is semi-circular in transverse cross section;
    said cradle member further having opposite ends separated by said channel;
    said frame includes a base extending between said opposite ends and located beneath said channel; and
    a pair of spaced-apart posts supporting said channel on said base.

* * * * *